United States Patent
Jang

(12) 
(10) Patent No.: US 6,548,913 B2
(45) Date of Patent: Apr. 15, 2003

(54) APPARATUS FOR GENERATING POWER USING WIND ENERGY

(76) Inventor: Keun-Suk Jang, 106-703, Shinik Kangbyeon Town 1-Cha, 408, Shinpyeong-2-Dong, Saha-Gu, Pusan (KR)

( * ) Notice: Subject to any disclaimer, the term of this patent is extended or adjusted under 35 U.S.C. 154(b) by 38 days.

(21) Appl. No.: 09/927,311

(22) Filed: Aug. 13, 2001

(65) Prior Publication Data

US 2002/0024222 A1 Feb. 28, 2002

(30) Foreign Application Priority Data

Aug. 26, 2000 (KR) ........................................ 2000-49854

(51) Int. Cl.⁷ ................................................ F03D 9/00
(52) U.S. Cl. .......................................... 290/55; 416/166
(58) Field of Search ............................ 290/55; 416/166, 416/9

(56) References Cited

U.S. PATENT DOCUMENTS

| | | | | |
|---|---|---|---|---|
| 1,777,254 A | * | 9/1930 | Connors | 416/166 |
| 4,362,467 A | * | 12/1982 | Elliott | 416/157 R |
| 4,365,937 A | * | 12/1982 | Hiebert et al. | 416/157 R |
| 4,764,090 A | * | 8/1988 | Danson | 416/17 |
| 5,178,518 A | * | 1/1993 | Carter, Sr. | 416/11 |
| 5,213,470 A | * | 5/1993 | Lundquist | 416/9 |
| 5,242,265 A | * | 9/1993 | Hora et al. | 416/26 |
| 6,340,290 B1 | * | 1/2002 | Schott et al. | 416/157 R |
| 6,478,542 B1 | * | 11/2002 | Elliott | 416/61 |

FOREIGN PATENT DOCUMENTS

DE 3925175 A1 * 2/1991 ............ B63G/8/16

* cited by examiner

*Primary Examiner*—Joseph Waks
(74) *Attorney, Agent, or Firm*—Jacobson Holman PLLC

(57) ABSTRACT

An apparatus for generating power using wind energy, including connecting shafts arranged around a boss and rotatably supported by the boss, pinions each fitted around the associated connecting shaft to rotate along with the associated connecting shaft, rack housings each fixedly mounted to the boss near the associated pinion, rack gears each slidably received in the associated rack housing and engaged with the associated pinion, springs each fitted around a portion of the associated rack gear extending beyond the rack housing receiving the associated rack gear and adapted to urge the associated rack gear toward an end of the associated rack gear protruded from the associated rack housing, and spring force adjusting knobs each threadedly coupled to the protruded end of the associated rack gear and adapted to adjust a spring force of the associated spring.

3 Claims, 8 Drawing Sheets

APPARATUS FOR GENERATING POWER USING WIND ENERGY

BACKGROUND OF THE INVENTION

1. Field of the Invention

The present invention relates to an apparatus for generating power using wind energy, and more particularly to an apparatus for generating power using wind energy, which includes blades configured to vary in angle by themselves in proportion to the velocity and pressure of wind, thereby being capable of utilizing wind energy at a maximum efficiency.

2. Description of the Related Art

As well known, a large part of energy essentially required by modern society is obtained from fossil fuel. However, there are problems involved with the use of fossil fuel in that fossil fuel is not only limited in availability, but also causes environmental pollution. For this reason, research has been made to develop techniques capable of utilizing inexhaustible clean energy such as solar energy, geothermal energy, wind energy, and tidal energy. A part of those techniques has been advanced to a considerable level of practical use.

Wind energy is the most available inexhaustible clean energy source. For this reason, a variety of structures for utilizing wind energy have been developed.

At the early stage of development, a windmill including blades having an enlarged surface to absorb an increased quantity of wind energy has been proposed. However, such a blade structure has a drawback in that when wind has an excessively high velocity, it may damage the windmill.

In order to avoid damage to windmills due to wind, an improved blade structure has been proposed, in which each of blades has a curved surface while being twisted by a certain angle, thereby being capable of achieving an increase in the efficiency of utilizing wind while obtaining an increased blade stiffness.

However, this blade structure still has a limited resistance to wind force. This problem may be solved by a structure configured to vary in angle in accordance with the velocity of wind. For example, U.S. Pat. No. 4,006,925 discloses a windmill including a slider configured to be slidable along a blade shaft. The slider is retained in position by a tension spring, and is shifted when the centrifugal force generated during a rotation of blades exceeds the tension of the tension spring. The shift of the slider results in a variation in the angle of each blade with respect to wind velocity.

Although the windmill having the above mentioned structure is considered to have a considerable validity in terms of principles, it practically involves a problem in that it cannot achieve a maximum utilization of wind energy because it is very difficult to make the tension of the tension spring retaining the slider be proportional to the centrifugal force generated during the rotation of the blades, thereby causing the range of available wind velocity to be considerably limited.

Another example is disclosed in Korean Patent Laid-open Publication No. 1998-41042. In an apparatus for generating electric power using wind energy, disclosed in Korean Patent Laid-open Publication No. 1998-41042, a torsion spring is mounted to the back surface of each blade. When the blade is subjected to wind of an increased velocity, it is gradually inclined in a rearward direction against the force of the torsion spring. Thus, damage to blades due to increased wind pressure may be prevented.

In the illustrated case, however, there is an inefficiency in terms of the utilization of wind energy because each blade is inclined to be in parallel to the direction of wind. Furthermore, the apparatus may easily be damaged or broken when it is subjected to a severe variation in wind velocity.

SUMMARY OF THE INVENTION

Therefore, an object of the invention is to provide an apparatus for generating power using wind energy, which has a configuration capable of automatically adjusting the angle of blades in response to the force of wind applied to those blades, thereby achieving a maximum utilization of wind energy.

In accordance with one aspect, the present invention provides an apparatus for generating power using wind energy, comprising blades for receiving the wind energy, further comprising: a plurality of connecting shafts arranged around a boss and rotatably supported by the boss, each of the connecting shafts extending radially and supporting an associated one of the blades; pinions each fitted around an associated one of the connecting shafts to rotate along with the associated connecting shaft; rack housings each fixedly mounted to the boss near an associated one of the pinions; rack gears each slidably received in an associated one of the rack housings and engaged with an associated one of the pinions; springs each fitted around a portion of an associated one of the rack gears extending beyond the rack housing receiving the associated rack gear and adapted to urge the associated rack gear toward an end of the associated rack gear protruded from the associated rack housing; and spring force adjusting knobs each threadedly coupled to the protruded end of an associated one of the rack gears and adapted to adjust a spring force of an associated one of the springs, whereby each of the blades is angularly shifted about an axis orthogonal to a rotating shaft for the blades in response to a variation in a pressure of wind applied to the blades.

Each of the blades may be eccentrically arranged with respect to an associated one of the connecting shafts.

In accordance with another aspect, the present invention provides an apparatus for generating power using wind energy, comprising blades for receiving the wind energy, further comprising: a plurality of connecting shafts arranged around a boss and rotatably supported by the boss, each of the connecting shafts extending radially and supporting an associated one of the blades; arms each mounted, at one end thereof, to an associated one of the connecting shafts while extending orthogonally from the associated connecting shaft; arc-shaped rods each mounted, at one end thereof, to the other end of an associated one of the arms while extending orthogonally from the associated arm; guide members attached to the boss and adapted to guide respective movements of the arc-shaped rods, respectively, each of the guide members having a guide hole allowing an associated one of the arc-shaped rods to pass therethrough; and springs each fitted around an associated one of the arc-shaped rods between an associated one of the guide members and a flange formed at the other end of the associated arc-shaped rod, whereby each of the blades is angularly shifted about an axis orthogonal to a rotating shaft for the blades in response to a variation in a pressure of wind applied to the blades.

The apparatus may further comprise wind direction sensing means for sensing a variation in the direction of wind applied to the blades, the wind direction sensing means including a vertical shaft, a wind direction indicating member fixedly mounted to an upper end of the vertical shaft and adapted to change an orientation thereof in response to a variation in the direction of wind applied to the blades while correspondingly rotating the vertical shaft, a cam plate mounted to a desired portion of the vertical shaft to rotate simultaneously with the rotation of the vertical shaft, and a micro switch adapted to come selectively into contact with a periphery of the cam plate in accordance with the rotation of the cam plate, thereby generating an electrical signal; pivoting means for pivoting the rotating shaft in response to the wind direction variation sensed by the wind direction sensing means, thereby changing an orientation of the blades, the pivoting means including a housing arranged to support the rotating shaft while being rotatable in response to the wind direction variation to change an orientation of the rotating shaft, and an electromagnet activated by the electrical signal from the micro switch to change an orientation of the rotating shaft; and braking means for restraining the rotation of the housing in response to the activation of the electromagnet.

BRIEF DESCRIPTION OF THE DRAWINGS

The above objects, and other features and advantages of the present invention will become more apparent after a reading of the following detailed description when taken in conjunction with the drawings, in which:

FIG. 7b is a sectional view illustrating an essential configuration of the apparatus shown in FIG. 7a.

DESCRIPTION OF THE PREFERRED EMBODIMENTS

Figure 1:
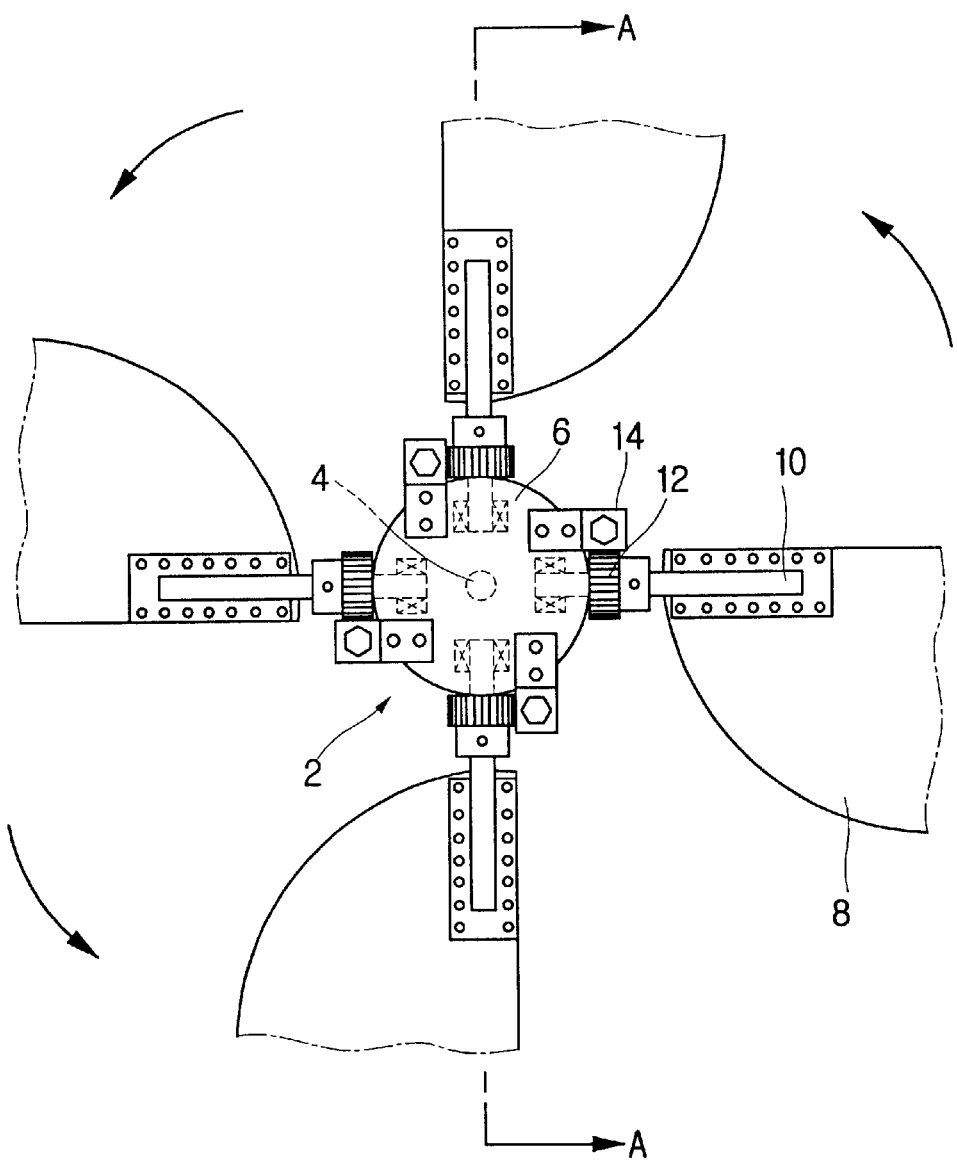
FIG. 1 is a rear view illustrating a blade assembly included in an apparatus for generating power using wind energy in accordance with an embodiment of the present invention.

Referring to FIG. 1, an apparatus for generating power using wind energy in accordance with an embodiment of the present invention is illustrated. As shown in FIG. 1, the apparatus includes a blade assembly 2 having a boss 6 in which a rotating shaft 4 is centrally fitted. The blade assembly 2 also has a plurality of blades 8 arranged around the boss 6 while extending radially from the boss 6. A plurality of connecting shafts 10 are rotatably fitted in the boss 6 at their inner ends to firmly support the blades 8, respectively. Preferably, each blade 8 is eccentrically arranged with respect to the connecting shaft 10 associated therewith. Pinions 12 are fitted around respective connecting shafts 10 near the periphery of the boss 6. Each pinion 12 is fixedly coupled to the associated connecting shaft 10. Rack housings 14 are fixedly mounted to the boss 6 at positions respectively corresponding to the pinions 12 by means of, for example, welding.

When the blade assembly 2 is subjected to wind coming from the front side thereof, it is rotated in a direction indicated by the arrow in FIG. 1.

Figure 2:
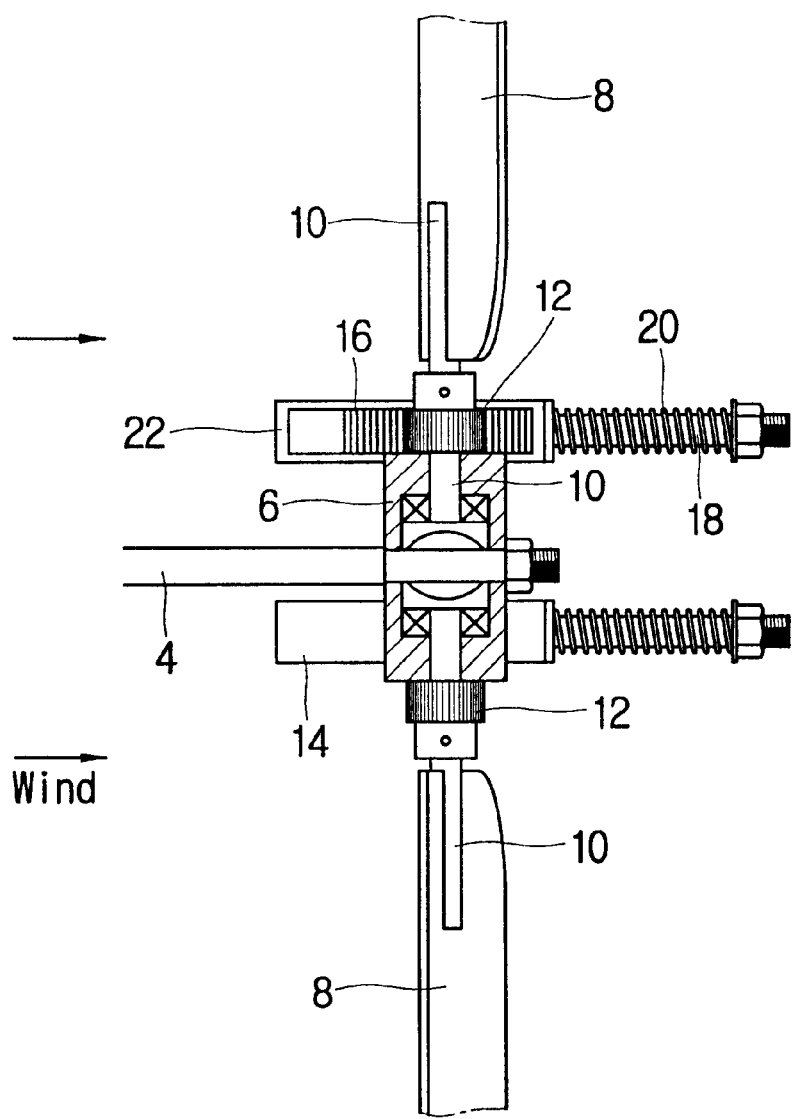
FIG. 2 is a cross-sectional view taken along the line A—A of FIG. 1.

As shown in FIG. 2, a rack gear 16 is received in each rack housing 14 so that it is slidable along the rack housing 14. The rack gear 16 is engaged with the pinion 12 associated therewith. The rack gear 16 extends outwardly beyond the associated rack housing 14 so that it is supported by a spring 20. That is, the spring 20 is fitted around the portion of the rack gear 16 extending beyond the associated rack housing 14. Preferably, a nut-shaped knob 22 is threadedly coupled to the outer end of each rack gear 16 in order to adjust the spring force of the spring 20. The rack gear 16 is always urged away from the rack housing 14 by the spring force of the spring 20 applied thereto.

Figure 3:
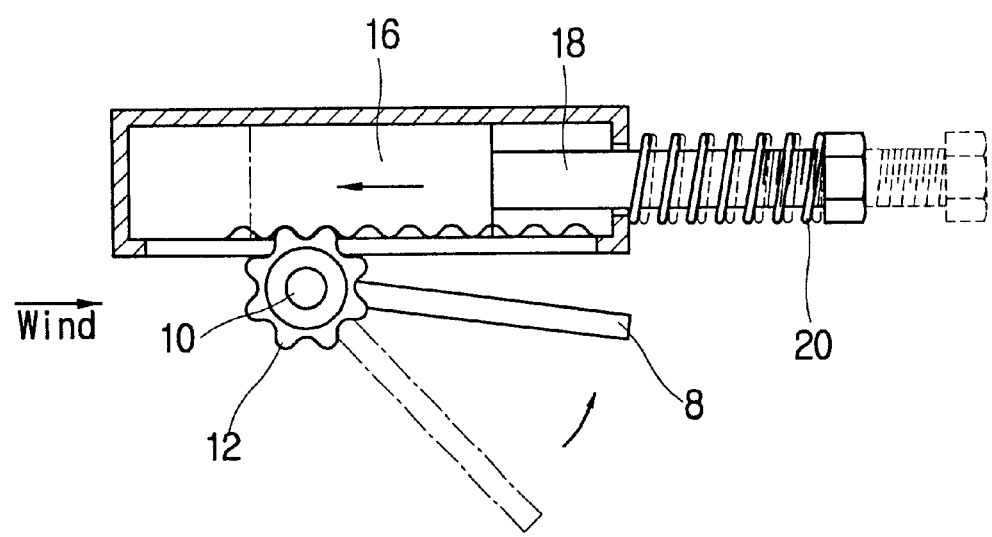
FIG. 3 is a sectional view illustrating the configuration of blade angle change means included in the apparatus of the present invention.

By virtue of the spring force of the spring 20, the associated blade 8 is urged to hinge toward a minimum tilt position indicated by the dotted line of FIG. 3 so that it is subjected to wind coming from a direction indicated by the arrow of FIG. 3 at a maximum area orthogonal to the direction of the wind.

When the pressure of wind applied to the front surface of each blade 8 increases to greater than the spring force of the spring 20 due to an increase in the velocity of the wind, the blade 8 hinges, along with a rotation of the associated connecting shaft 10, about the axis of the connecting shaft 10 by the wind pressure until the applied wind pressure is balanced with the spring force of the spring 20. That is, each blade 8 is angularly shifted to an angular position where the applied wind pressure is balanced with the spring force of the spring 20. The rotation of the connecting shaft 10 occurring when the associated blade 8 is subjected to the wind pressure exceeding the spring force of the spring 20 will be described in conjunction with FIG. 3. The rotation of the connecting shaft 10 resulting from the wind pressure applied to the associated blade 8 causes the associated pinion 12 to rotate. In accordance with the rotation of the pinion 12, the rack gear 16 engaged with the pinion 12 is shifted from the position indicated by the dotted line of FIG. 3 to the position indicated by the solid line of FIG. 3 while compressing the spring 20. When the wind force is reduced below the spring force of the compressed spring 20, the rack gear 16 is returned toward its original position by virtue of the spring force of the spring 20. Thus, each blade 8 is continuously angularly shifted in accordance with the variation in the pressure of wind applied thereto.

Since the angle of each blade 8 is automatically changed in accordance with the pressure of wind, as described above, the blade 8 is effectively rotated about the central shaft 4 even by wind of a weak intensity. By wind of a high velocity, the blade 8 is also rotated about the central shaft 4 while correspondingly shifting its angle. Accordingly, it is possible to obtain desired power from wind of a wide velocity range without any probability of damage to the blades 8.

In order to achieve a further improved wind utilization efficiency, the power generating apparatus may further include wind direction sensing means for changing an orientation of each blade 8 in response to a variation in the direction of wind, in order to achieve an enhanced wind utilization efficiency.

Figure 4:
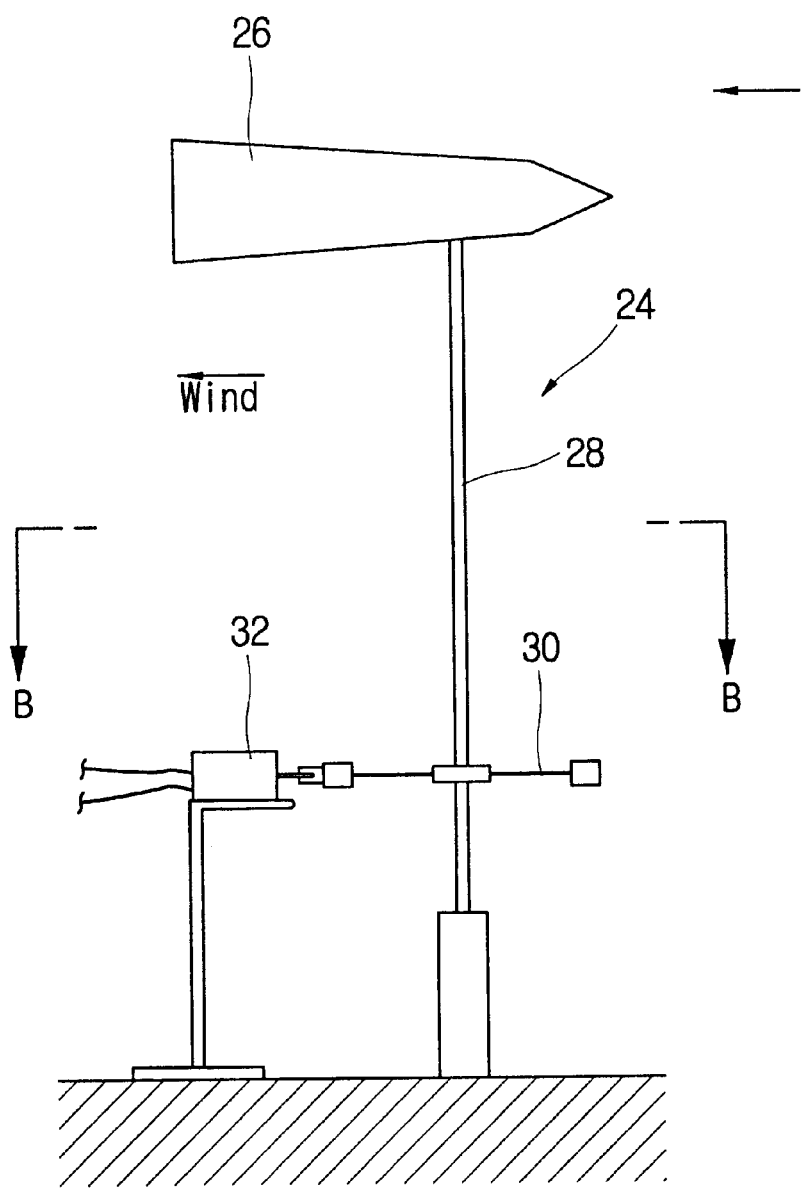
FIG. 4 is a side view illustrating wind direction sensing means included in the apparatus of the present invention.

An example of such wind direction sensing means is illustrated in FIG. 4. As shown in FIG. 4, the wind direction sensing means includes a wind direction indicating member 26 which may be typically used in a general anemoscope.

The wind direction indicating member 26 is fixedly mounted to the upper end of a vertical shaft 28. A cam plate 30 is mounted to a desired portion of the vertical shaft 28 so that it rotates simultaneously with a rotation of the vertical shaft 28. A microswitch 32 is arranged near one side of the cam plate 30 such that it comes selectively into contact with the periphery of the cam plate 30, thereby generating an electrical signal.

Figure 5:
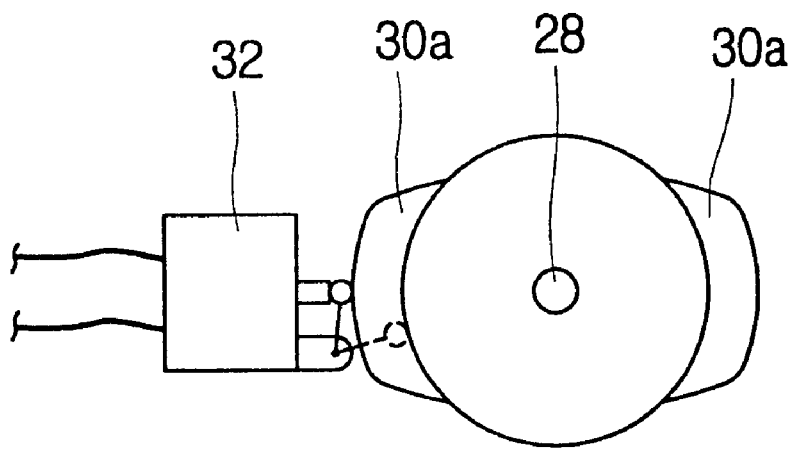
FIG. 5 is a cross-sectional sectional view taken along the line B—B of FIG. 4.

The arrangement relationship between the cam plate 30 and the micro switch 32 is illustrated in FIG. 5. As shown in FIG. 5, the micro switch 32 is configured to be switched on when it comes into contact with one of cams 30 protruded from the periphery of the cam plate 30.

In association with the wind direction sensing means, the apparatus also includes means for pivoting the rotating shaft 4 in response to a wind direction variation sensed by the wind direction sensing means, thereby changing an orientation of the blades 8. Each blade 8 is changed in its direction in accordance with an operation of the pivoting means conducted in response to an ON or OFF signal from the microswitch 32.

Figure 6:
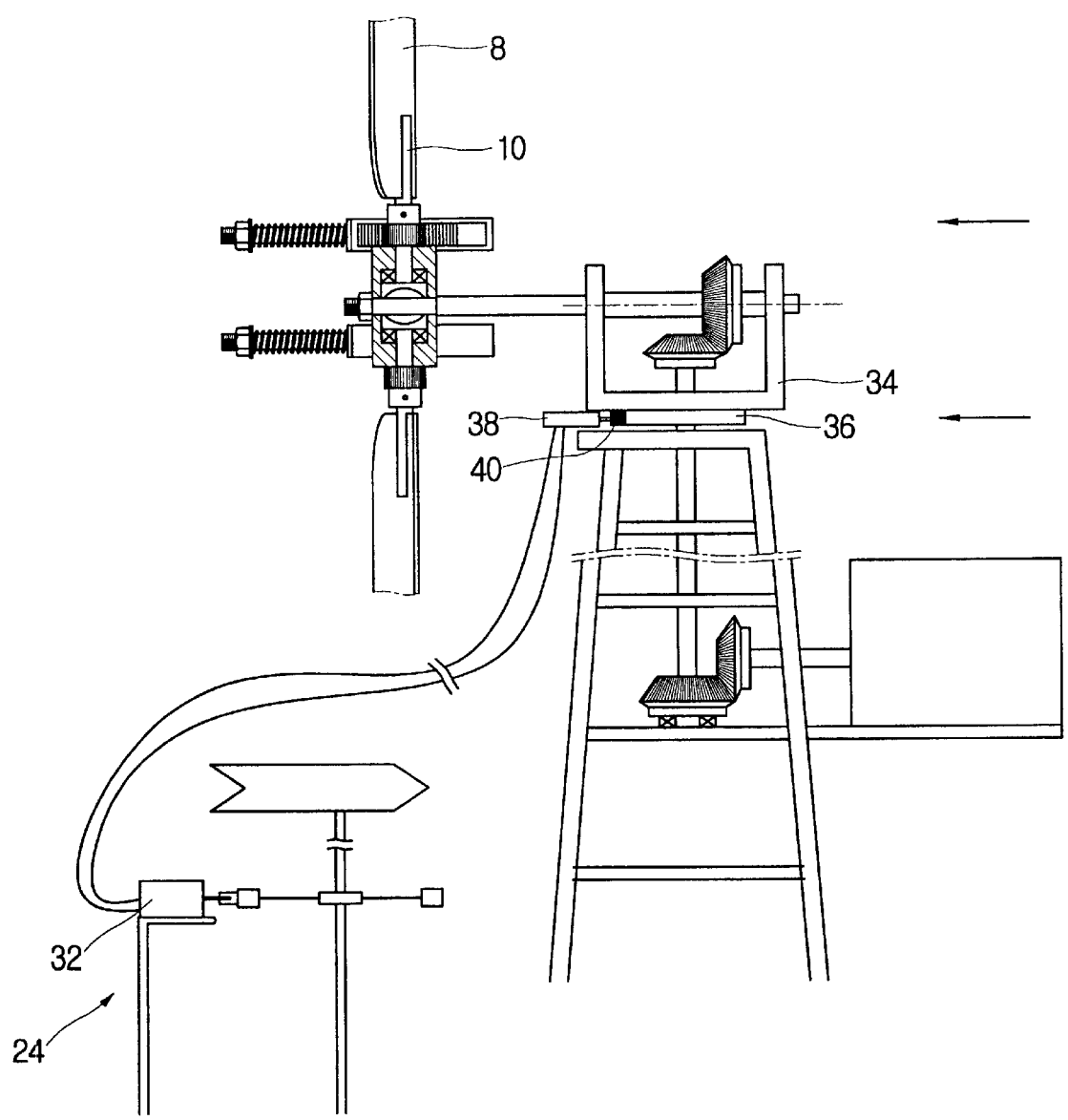
FIG. 6 is a sectional view illustrating the entire configuration of the apparatus according to the present invention.

This will be described in more detail with reference to FIG. 6. A member 36 providing a braking surface is fixed to the bottom of a housing 34 adapted to support the central shaft 4 of the boss 6. An electromagnet 38 is arranged near one side of the member 36. A braking member 40 is operatively connected to the electromagnet 38 so that it comes selectively into contact with the braking surface of the member 36 when it is actuated by the electromagnet 38. By this arrangement, the housing 34 can be selectively restrained or released.

When wind applied to the blades 8 changes in direction, the wind direction sensing means 24 is rotated in accordance with the changed wind direction. As a result, the micro switch 32 conducts its ON and OFF operations as it comes selectively into contact with the cam plate 30. In accordance with the ON and OFF operations of the micro switch 32, the electromagnet 38 operates to sequentially restrain and release the housing 34.

The reason why the housing 34 has to be sequentially restrained and released will be described hereinafter.

The arrangement of the cams 30a on the cam plate 30 is determined, based on data about seasonal variations in wind direction inherent to the area where the apparatus of the present invention is installed, in such a fashion that the cams 30a correspond to the most common directions of wind, respectively. For example, where the apparatus of the present invention is installed in an area where southwestern wind and northeastern wind are predominant for the season, the cams 30a are arranged in such a fashion that they are oriented in southwestern and northeastern directions, respectively. When wind direction changes, for example, from the southwestern direction to the northeastern direction in this case, the cam plate 30 sequentially switches off and on while being rotated by 180°. In accordance with the sequential OFF and ON operations of the micro switch 32, the housing 34 is released from its restrained state for a given time, and then restrained again. During the releasing time of the housing 34, the blades 8 are angularly rotated by the wind applied thereto so that they are adapted to the changed wind direction. After the adaptation of the blades 8 to the wind direction change, the housing 34 is restrained again to fix the orientation of the blades 8.

As in conventional windmills, a gear train using bevel gears is received in the housing 34 in order to transmit the rotating force of the blades to an electric generator or the like via orthogonal paths.

Figure 7A:
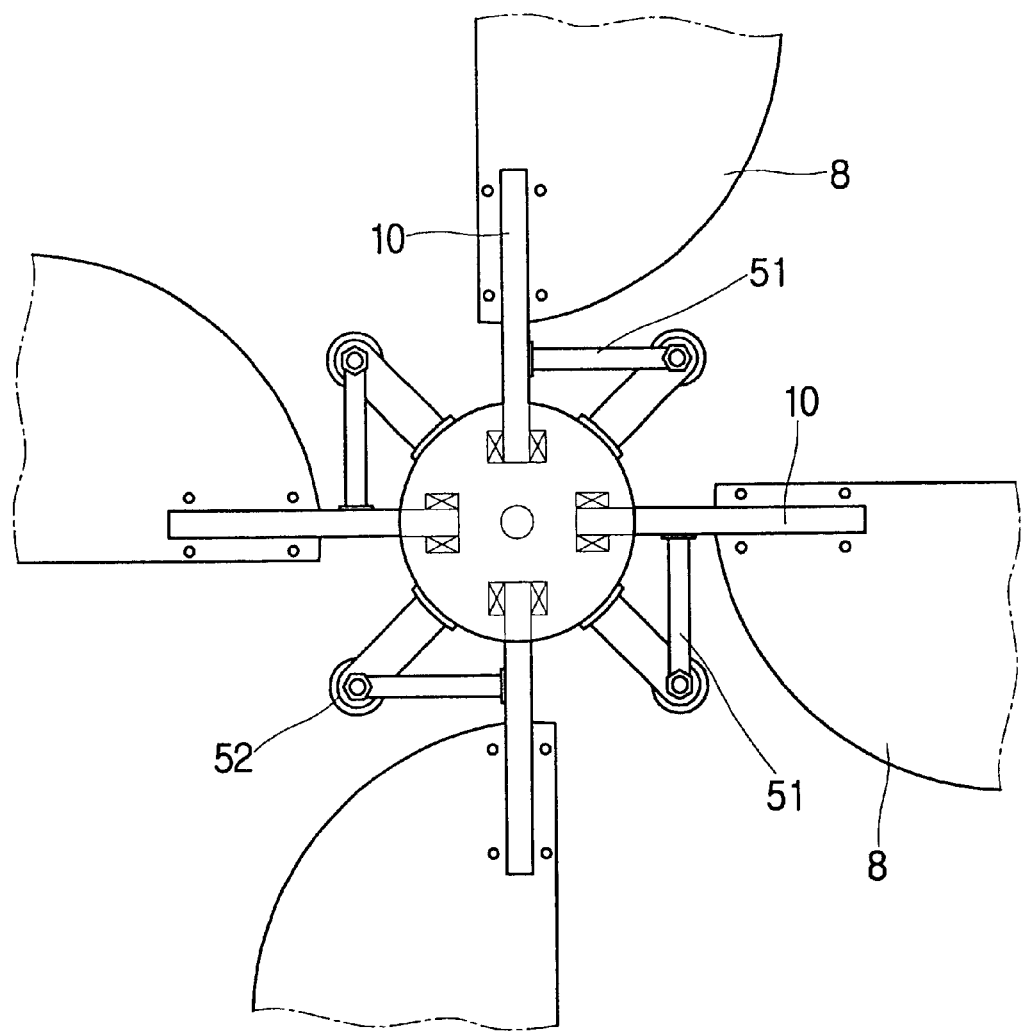
FIG. 7a is a front view illustrating a blade assembly included in an apparatus for generating power using wind energy in accordance with another embodiment of the present invention.
Figure 7B:
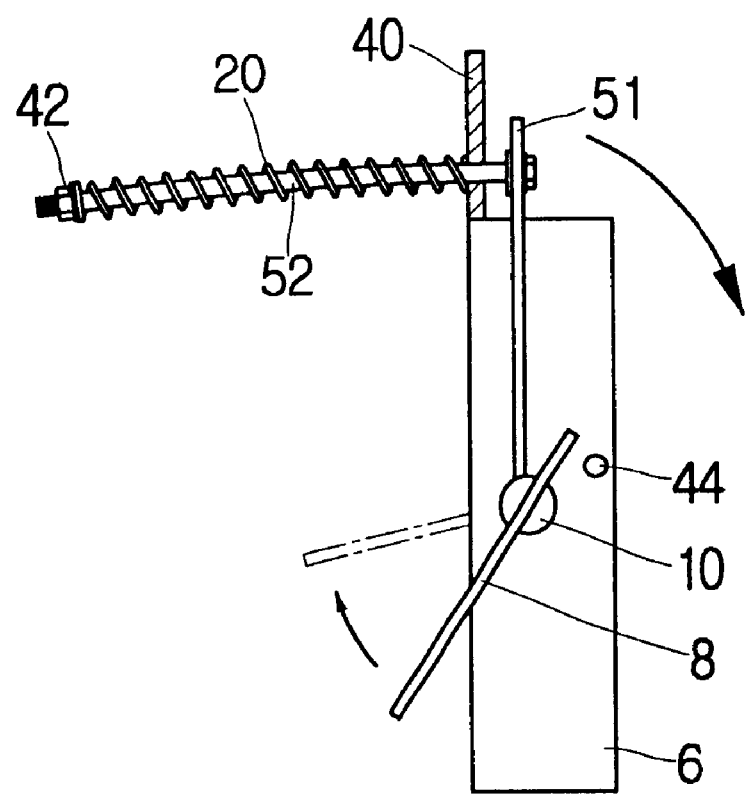

Referring to FIGS. 7a and 7b, a modified embodiment of the present invention is illustrated, respectively.

In accordance with this modified embodiment, an arm 36 is mounted, at one end thereof, to the connecting shaft 10 of each blade 8 so that it extends orthogonally from the connecting shaft 10. An arc-shaped rod 52 is also mounted, at one end thereof, to the other end of the arm 51 so that it extends orthogonally from the arm 51 while passing though a hole formed at a guide member 40 attached to the boss 6. A spring 20 is fitted around the arc-shaped rod 52 between the guide member 40 and a flange 42 formed at the other end of the arc-shaped rod 52. For each blade 8, a stopper 44 is provided at a desired portion of the boss 6 in order to allow the arm 51 to rotate only in a desired direction.

In the above described configuration according to the modified embodiment, each blade 8 can be angularly shifted to a position indicated by the dotted line of FIG. 7b in response to the pressure of wind applied thereto, as in the embodiment of FIG. 1. Accordingly, this embodiment provides the same effect as that in the above described embodiment.

As apparent from the above description, the present invention provides an apparatus for generating power using wind energy, which has a configuration capable of allowing the orientation of blades to be automatically changed in response to a variation in the pressure of wind applied to those blades so that the blades are oriented at such an angle effective to allow the blades to efficiently receive wind energy while adapting the blades to the wind. Accordingly, the power generating apparatus of the present invention provides superior effects in that it can convert wind energy into power without any loss. That is, the power generating apparatus of the present invention is configured to allow the blades to be rotated even by wind of a weak intensity while allowing the blades to be appropriately angularly shifted in response to wind of a strong intensity, thereby being capable of utilizing wind energy at a maximum efficiency without any damage to the blades.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating power using wind energy, comprising blades for receiving the wind energy, further comprising:
   a plurality of connecting shafts arranged around a boss and rotatably supported by the boss, each of the connecting shafts extending radially and supporting an associated one of the blades;
   pinions each fitted around an associated one of the connecting shafts to rotate along with the associated connecting shaft;
   rack housings each fixedly mounted to the boss near an associated one of the pinions;
   rack gears each slidably received in an associated one of the rack housings and engaged with an associated one of the pinions;
   springs each fitted around a portion of an associated one of the rack gears extending beyond the rack housing receiving the associated rack gear and adapted to urge the associated rack gear toward an end of the associated rack gear protruded from the associated rack housing; and spring force adjusting knobs each threadedly coupled to the protruded end of an associated one of the rack gears and adapted to adjust a spring force of an associated one of the springs, whereby each of the blades is angularly shifted about an axis orthogonal to a rotating shaft for the blades in response to a variation in a pressure of wind applied to the blades.

2. The apparatus according to claim 1, wherein each of the blades is eccentrically arranged with respect to an associated one of the connecting shafts.

3. The apparatus according to claim 1, further comprising:

wind direction sensing means for sensing a variation in the direction of wind applied to the blades, the wind direction sensing means including a vertical shaft, a wind direction indicating member fixedly mounted to an upper end of the vertical shaft and adapted to change an orientation thereof in response to a variation in the direction of wind applied to the blades while correspondingly rotating the vertical shaft, a cam plate mounted to a desired portion of the vertical shaft to rotate simultaneously with the rotation of the vertical shaft, and a micro switch adapted to come selectively into contact with a periphery of the cam plate in accordance with the rotation of the cam plate, thereby generating an electrical signal;

pivoting means for pivoting the rotating shaft in response to the wind direction variation sensed by the wind direction sensing means, thereby changing an orientation of the blades, the pivoting means including a housing arranged to support the rotating shaft while being rotatable in response to the wind direction variation to change an orientation of the rotating shaft, and an electromagnet activated by the electrical signal from the micro switch to change an orientation of the rotating shaft; and braking means for restraining the rotation of the housing in response to the activation of the electromagnet.

\* \* \* \* \*